United States Patent
Saito et al.

(10) Patent No.: US 8,315,331 B2
(45) Date of Patent: Nov. 20, 2012

(54) TRANSMISSION METHOD, TRANSMISSION CIRCUIT AND TRANSMISSION SYSTEM

(75) Inventors: Hideaki Saito, Tokyo (JP); Hiroaki Ikeda, Tokyo (JP)

(73) Assignees: NEC Corporation, Tokyo (JP); Elpida Memory, Inc., Tokyo (JP)

( * ) Notice: Subject to any disclaimer, the term of this patent is extended or adjusted under 35 U.S.C. 154(b) by 822 days.

(21) Appl. No.: 12/379,167

(22) Filed: Feb. 13, 2009

(65) Prior Publication Data

US 2009/0220025 A1 Sep. 3, 2009

(30) Foreign Application Priority Data

Feb. 28, 2008 (JP) ................................. 2008-048313

(51) Int. Cl.
*H04L 27/04* (2006.01)
(52) U.S. Cl. ........ 375/295; 375/353; 375/238; 375/130; 375/135; 341/152
(58) Field of Classification Search .................. 375/238, 375/353, 295, 130
See application file for complete search history.

(56) References Cited

U.S. PATENT DOCUMENTS

| | | | |
|---|---|---|---|
| 5,644,311 A * | 7/1997 | Choudhury et al. | 341/152 |
| 6,769,044 B2 | 7/2004 | Matsuzaki | |
| 6,996,201 B2 | 2/2006 | Arima | |
| 7,787,513 B2 * | 8/2010 | Siwiak et al. | 375/130 |
| 2001/0017905 A1 | 8/2001 | Arima | |
| 2006/0018407 A1 | 1/2006 | Osaka et al. | |
| 2007/0053421 A1 * | 3/2007 | Srodzinksi | 375/238 |
| 2009/0003428 A1 * | 1/2009 | Kaul et al. | 375/238 |

FOREIGN PATENT DOCUMENTS

| | | |
|---|---|---|
| JP | 4-196263 | 7/1992 |
| JP | 2001-230824 | 8/2001 |
| JP | 2002-026283 | 1/2002 |
| JP | 2003-32084 A | 1/2003 |
| JP | 2005-079873 | 3/2005 |
| JP | 2006-041818 | 2/2006 |
| JP | 2007-189356 | 7/2007 |
| WO | WO 2007/005060 A1 | 1/2007 |

OTHER PUBLICATIONS

"Current Status of Research and Development for Three-Dimensional Chip Stack Technology" K. Takahashi, et al., Japanese Journal of Applied Physics, pp. 3032-3037, Apr. 2001.

Japanese Office Action dated Aug. 21, 2012, with partial English translation.

* cited by examiner

*Primary Examiner* — Eva Puente
(74) *Attorney, Agent, or Firm* — McGinn IP Law Group, PLLC

(57) ABSTRACT

A transmission method for transmitting transmission data via a single line, includes: transmitting, as the transmission data, data that has one rising or falling transition of the amplitude of the data in each clock cycle of a clock and that carries a 2- or greater-bit value, making use of the phase from the edge of the clock to the transition in amplitude of the data.

2 Claims, 12 Drawing Sheets

TRANSMISSION METHOD, TRANSMISSION CIRCUIT AND TRANSMISSION SYSTEM

This application is based upon and claims the benefit of priority from Japanese patent application No. 2008-48313, filed on Feb. 28, 2008, the disclosure of which is incorporated herein in its entirety by reference.

BACKGROUND OF THE INVENTION

1. Field of the Invention

The present invention relates to a transmission method, transmission circuit and transmission system, in particular to a transmission method, transmission circuit and transmission system for transmitting data between semiconductor chips inside a semiconductor device including a plurality of semiconductor chips.

2. Description of the Related Art

Recently, the integration density of a semiconductor circuit has been improved thanks to miniaturization of semiconductor integrated circuits, and this trend has developed central processing units (CPU) into high-performance devices and memories into high-capacity devices. However, there is a limit to miniaturization of semiconductor integrated circuits. Accordingly, it is necessary to introduce a new technology in order to further increase the integration density. As one technology, a semiconductor device including stacked semiconductor chips has been proposed. For example, see Japanese Patent Application Laid-open H04-196263 and Japanese Patent Application Laid-open 2002-26283. Japanese Patent Application Laid-open H04-196263 discloses a means for realizing a large scale integrated circuit in which its chip area is not changed by stacking semiconductors. Japanese Patent Application Laid-open H04-196263 also discloses a technique for integrating a memory circuit in a separate chip that is stacked over the main semiconductor integrated circuit. On the other hand, Japanese Patent Application Laid-open 2002-26283 discloses a further increased capacity multi-layered memory structure by constructing memory cell arrays in multi-levels.

FIG. 1 shows a schematic sectional diagram showing one example of a chip stacked semiconductor device. When semiconductor chips 120 are arranged in layers, in addition to interconnections within each chip surface, interconnections between chips are needed. Through-hole interconnection 121 is used as the interconnection between chips. Through-hole interconnection 121 is a wiring that penetrates from the top surface to the undersurface of a semiconductor substrate of a chip in order to improve interconnection density. Here, reference numeral 122 denotes an insulation film. Non-patent document 1 (K. Takahashi et al., Japanese Journal of Applied Physics, 40, 3032(2001)) discloses a technique for forming through-hole interconnection. Specifically, first, a Si substrate that is to be the semiconductor chip is thinned down to 50 μm. Then, a hole of 10 μm square that penetrates from the top surface through to the undersurface of the substrate is formed in the substrate. Subsequently, the hole is filled up with metal so as to form a through-hole interconnection for inter-chip wiring. If this through-hole interconnection is used as an inter-chip wiring, it becomes possible to arrange inter-chip wiring three-dimensionally within the chip surface, and it also becomes possible to provide some hundreds of inter-chip lines. Between such multi-layered semiconductor chips, data is transmitted via through-hole interconnections.

FIG. 2 is a configurational diagram showing one example of a transmission circuit for performing data transmission between semiconductor chips. This transmission circuit transmits 1-bit (binary) digital data via through-hole interconnection 15 between transmission-side chip 10 and reception-side chip 20. FIG. 3 is a waveform chart when two bits of data are transmitted in parallel in the transmission circuit shown in FIG. 2.

In the transmission circuit of FIG. 2, the data transmitted from flip-flop 11 in transmission-side chip 10 at the leading edge timing of the inter-chip synchronizing clock is sent to the outside of transmission-side chip 10 by way of output buffer 12. FIG. 3(A) shows inter-chip synchronizing clock CLK. Transmission-side chip 10, using both Data0 as 1-bit (binary) data shown in FIG. 3(B), and Data1 as 1-bit (binary) data shown in FIG. 3(C), transmits data having a value "1" during the first clock cycle of inter-chip synchronizing clock CLK, data having a value "2" during the second cycle, data having a value "0" during the third cycle and data having a value "3" during the fourth cycle. Here, in order to transmit two bits of data in parallel, two circuit portions each consisting of flip-flop 11 and output buffer 12 are needed. Similarly, reception-side chip 20 also needs two circuit portions having the configuration shown in FIG. 2.

The data transmitted from transmission-side chip 10 is received by reception-side chip 20 via through-hole interconnection 15. Reception-side chip 20 includes ESD protecting element 21 at the input terminal. In reception-side chip 20, the received data is supplied to the data input terminal of flip-flop 23 via input buffer 22. Flip-flop 23 takes up the received data supplied to the data input terminal at the leading edge timing of the clock supplied to the clock input terminal of flip-flop 23. FIGS. 3(D) and 3(E) show received 1-bit (binary) data Data0 and 1-bit(binary) data Data1, taken up by flip-flop 23 in reception-side chip 20. The clock in transmission-side chip 10 and the clock in reception-side chip 20 are synchronized with each other.

In the transmission circuit shown in FIG. 2 for transmitting binary digital data of "0" and "1", the parasite capacitance of through-hole interconnection 15 and the capacitance of ESD protecting element 21 in reception-side chip 20 are charged and discharged based on the transmission data. Among four transmission data transition patterns, specifically, the transition pattern from "1" to "1", the transition pattern from "1" to "0", the transition pattern from "0" to "0" and the transition pattern from "0" to "1", discharging is done in the transition pattern from "1" to "0" while charging is done in the transition pattern from "0" to "1". Accordingly, when charging or discharging is done once, the number of times of charging/discharging is defined as 1, and the number of times of charging/discharging to transmit 1-bit data is expected to be 0.5 time for each clock cycle on average.

Since, when signal transmission between chips is done using through-hole interconnection 15 in the aforementioned transmission circuit, both the parasite capacitance of through-hole interconnection 15 and the capacitance of ESD protecting element 21 need to be charged and discharged, there is a problem that a large amount of electric power will be consumed. This problem will be detailed hereinbelow. The through-hole interconnection, differing from interconnections that have a 1 μm thickness in the chip plane, needs to have a thickness of 10 μm or greater. This is because in order to position the through-hole electrodes formed in individual semiconductor chips using different processes, the through-hole interconnection needs to have a size one digit greater than several a μm that is used as the positioning accuracy between chips.

Since the through-hole interconnection has a large thickness, its parasite capacitance that is made with the substrate is greater than that of the interconnection within the chip surface. For example, a through-hole interconnection that has a round section that is 20 µm in diameter with an insulation film that has a thickness of 250 nm formed around the outer periphery and that is formed passing through a Si semiconductor substrate, has an interconnection capacitance of 0.45 pF when the substrate is 50 µm thick or when the length of the through-hole wire is 50 µm. The interconnection capacitance of the wire on the surface generally used in the chip surface is about 0.2 pF per 1 mm length. Accordingly, the parasite capacitance on the through-hole interconnection per unit length is 45 times greater than the parasite capacitance of the in-plane interconnection. Further, in the case of inter-chip transmission, it is also necessary to attach an ESD protecting element to the signal input terminal of the chip. This also adds capacitance. As a result, when signal transmission between chips is carried out using through-hole interconnection 15, a large amount of electric power is consumed to charge and discharge the capacitance.

In inter-chip transmission, which entails a power consumption problem when through-hole interconnection is used, in order to reduce the electric power for charging and discharging for inter-chip transmission, it is necessary to transmit the same amount of data as the amount of data that is to be transmitted in binary form, by a lower number of times of charging/discharging than the number of times of charging/discharging that occurs during the transmission of the data in binary form. In other words, it is necessary to send a greater amount of data by the same number of times of charging/discharging. For example, there is a method of transmitting a greater number of values by making the amplitude of the transmission signal have multiple potential levels. As methods that do not use multiple potential levels, a method of transmitting data using pulse width modulation in which the pulse width is varied at multiple steps has been known (e.g., see Japanese Patent Application Laid-open 2005-79873). Japanese Patent Application Laid-open 2005-79873 discloses a transmission technology by multiplexing the data with different pulse widths over a one clock cycle.

However, the method for reducing the electric power for charging and discharging by using multiple potential levels for the amplitude of the transmission signal, or specifically the method of using multiple potential levels to send the same amount of data as the amount data that is to be transmitted in binary form by a lower number of times of charging/discharging than that during the transmission of the data in binary form, entails the problems that it needs multiple power supplies and that a low-amplitude signal is susceptible to the influence of noise.

On the other hand, when the method of using pulse width-modulated data for transmission, disclosed by Japanese Patent Application Laid-open 2005-79873, is used as inter-chip transmission that entails a power consumption problem when a through-hole interconnection is used, the following problem takes place. FIG. 4 shows a waveforms in a 4-level transmission technique for sending three bits of data via a single interconnection using the pulse width modulation transmitting technique. Here, it is assumed that four kinds of pulse widths are used in a one clock cycle of clock CLK shown in FIG. 4(A). Specifically, the pulse of the shortest width transmits data having a value "0". The greater the width that the pulse has, the greater is the value of data (data having values "1", "2" and "3") that the pulse transmits. Accordingly, the transmission data that is pulse width-modulated as shown in FIG. 4(B) is transmitted in the order of values "1", "2", "0" and "3". This order of data is the same order of data in the digital transmission shown in FIG. 3.

In the example shown in FIG. 4, the number of times of charging/discharging amounts to 2 in total, one charging and one discharging in each clock cycle. In the example shown in FIG. 4, when data is transmitted in an amount that is equal to the amount of data that the digital transmission circuit for transmitting 1-bit (binary) digital data transmits, the number of wires is halved but the number of times of charging/discharging is doubled. Accordingly, in order not to increase the number of times of charging/discharging in the pulse width modulation scheme to be greater than that of the digital transmission circuit, it is necessary to transmit a greater number of values than sixteen values or four bits of data, by a single line. Accordingly, in the transmission circuit based on pulse width modulation, in order not to increase power consumption in excess of that of the aforementioned digital transmission circuit, there is the problem in which a high-speed clock or a high-speed delay control to generate pulses having a pulse width smaller than $\frac{1}{16}$ of the clock cycle is needed.

SUMMARY OF THE INVENTION

The present invention has been achieved in view of the problem discussed above, it is therefore an object of the present invention to provide a transmission method, transmission circuit and transmission system which, even when a through-hole interconnection is used as the interconnection for data transmission between chips, can reduce power consumption by reducing the number of times of charging/discharging of the inter-chip interconnections per one clock cycle compared to the case where 1-bit (binary) digital data is transmitted, using neither multiple power sources, as used in a multi-level transmission scheme, nor a high-speed clock or a high-speed delay control that is needed in a pulse width modulation data transmission scheme.

In order to attain the above object, the transmission method according to an exemplary aspect of the first invention resides in a transmission method for transmitting transmission data via a single line, including: transmitting, as the transmission data, data that has one rising or falling transition of the amplitude of a signal of the data in each clock cycle of a clock and that carries a 2- or greater-bit value, making use of a phase from the edge of the clock to the timing of the transition in amplitude of the data.

Also, in order to attain the above object, the transmission circuit according to an exemplary aspect of the second invention resides in a transmission circuit for transmitting transmission data to a single line, including: a multiplied clock generator which generates a multiplied clock that is obtained by multiplying the frequency of a clock by N (N is a natural number equal to or greater than 2); a counter which counts the multiplied clock to obtain a count value, which makes one round in one clock cycle of the clock; a comparator which compares the count value on the counter with 2- or a greater-bit value of the data to be transmitted; and, a data generator which, in accordance with the result of comparison by the comparator, generates, as transmission data, data that has one rising or falling transition of the amplitude of the data in each clock cycle of the clock and carries a 2- or greater-bit value, making use of the phase from the edge of the clock to the transition in amplitude of the data.

Also, in order to attain the above object, the transmission circuit according to an exemplary aspect of the third invention resides in a transmission circuit for receiving, through a single line, data that has one rising or falling transition of the amplitude of the data in each clock cycle of a clock and carries a 2- or greater-bit value, making use of a phase from the edge of the clock to the transition in amplitude of the data, including: a phase detector which detects the phase of the transition in amplitude of the data from the edge of the clock; and a restoring portion which restores the data having the 2- or greater-bit value, based on the detection result from the phase detector.

Further, in order to attain the above object, the transmission system according to an exemplary aspect of the fourth invention resides in a transmission system for transmitting transmission data from a first semiconductor chip to a second semiconductor chip via a single inter-chip interconnection, wherein the first semiconductor chip includes: a multiplied clock generator which generates a multiplied clock that is obtained by multiplying the frequency of a clock by N (N is a natural number equal to or greater than 2); a counter which counts the multiplied clock to obtain a count value, which makes one round in one clock cycle of the clock; a comparator which compares the count value on the counter with a 2- or greater-bit value of data to be transmitted; and, a data generator which, in accordance with the result of comparison by the comparator, generates, as transmission data, data that has one rising or falling transition of amplitude of the data in each clock cycle of the clock and carries a 2- or greater-bit value, making use of the phase from the edge of the clock to the transition in amplitude of the data, and wherein, the second semiconductor chip includes: a phase detector which detects the phase of a transition of amplitude of received data from the first semiconductor chip via the inter-chip interconnection, from the edge of the clock; and a restoring portion which restores the transmitted data having the 2- or greater-bit value, based on the detection result from the phase detector.

The transmission method according to an exemplary aspect of the invention resides in a transmission method for transmitting transmission data via a single line, including: transmitting, as transmission data, data that has one rising and one falling transition of the amplitude of the data, alternately in each clock cycle of a clock and that carries a 2- or greater-bit value, making use of phases from edge of the clock to the transitions in amplitude of the data.

The transmission method according to an exemplary aspect of the invention resides in a transmission method for transmitting transmission data via a plurality of lines, including: transmitting, through each line, data that has one rising or falling transition of the amplitude of the data in each clock cycle of a clock and that carries a 1- or greater bit value, making use of the phase from the edge of the clock to the transition in amplitude of the data; and transmitting data by selecting one line for transmitting the data from the multiple lines in accordance with a 1- or greater bit value of other data to be transmitted for each of the same number of consecutive clock cycles of the clock as the number of the lines.

The transmission circuit according to an exemplary aspect of the invention resides in a transmission circuit for transmitting transmission data to a single line, including: a multiplied clock generator which generates a multiplied clock that is obtained by multiplying the frequency of a clock by N (N is a natural number equal to or greater than 2); a counter which counts the multiplied clock to obtain a count value, which makes one round in one clock cycle of the clock; a comparator which compares the count value on the counter with 2- or a greater-bit value of data to be transmitted; a control signal generator which generates a control signal which is obtained by halving the frequency of the clock and inverting the frequency-halved clock alternately for every clock cycle of the clock; and, a data generator which generates, as transmission data, data that has one rising or falling transition of the amplitude of the data in each clock cycle of the clock and that carries a 2- or greater-bit value, making use of the phase from the edge of the clock to the transition in amplitude of the data, by alternately selecting a signal having the same polarity with the output signal that represents the size-compared result from the comparator and with the polarity-inverted signal for every clock cycle of the clock, in accordance with the control signal.

The transmission circuit according to an exemplary aspect of the invention resides in a transmission circuit for transmitting transmission data to L lines (L is a natural number equal to or greater than 2), including: a multiplied clock generator which generates a multiplied clock that is obtained by multiplying the frequency of a clock by N (N is a natural number equal to or greater than 2); a counter which counts the multiplied clock to obtain a count value, which makes one round in one clock cycle of the clock; a detector which detects, among M-bit data (M is a natural number equal to or greater than 2) to be transmitted, whether the (M-K) bit value (K is a natural number equal to greater than 1 and less than M) agrees with the count value on the counter; a decoder which outputs L signals based on the value of the remaining K bits of the M-bit data and which decodes the value of the K bits so that only one signal in the L signals takes a predetermined logical value in each clock cycle of the clock based on the value of the K bits; and, a data generator which, based on the output signal from detector and the L signals from the decoder, generates as the transmission data, L signals to be transmitted through the L lines, such that only one of the L signals to be transmitted through the L lines has a transition of the amplitude of the signal in each clock cycle of the clock and such that the rising or falling edge of the transition in amplitude of the signal is shifted by a phase that is equivalent to an integer (from zero to N−1) multiple of N-division of one clock cycle of the clock.

The transmission circuit according to an exemplary aspect of the invention resides in a transmission circuit for receiving, through a single line, data that has one rising or falling transition of the amplitude of the data in each clock cycle of a clock and that carries a 2- or greater-bit value, making use of the phase from the edge of the clock to the transition in amplitude of the data, including: a control signal generator which generates a control signal by halving frequency of the clock and inverting the frequency-halved clock at each clock cycle of the clock; a selector which alternately selects a signal having the same polarity with data received through the line and with the inverted signal thereof at each clock cycle of the clock, in accordance with the control signal; a down-counter that is reset by the signal output from the selector, which detects the phase from the edge of the clock to a transition in amplitude of the data by down-counting a multiplied clock that is obtained by multiplying the clock by N (N is a natural number equal to or greater than 2); and a restoring portion which restores the data having the 2- or greater-bit value, based on the value on the down-counter.

The transmission circuit according to an exemplary aspect of the invention resides in a transmission circuit for receiving L signals (L is a natural number equal to or greater than 2), which are transmitted through separate L lines and which are constructed such that, based on K-bit data (K is a natural number equal to or greater than 2) of transmitted M-bit data (M is natural number equal to or greater than 2), only one signal in the L signals has a transition of the amplitude of the signal in each clock cycle of a clock, and the rising or falling edge of the transition in amplitude of the signal is shifted by a phase that is equivalent to an integer (from zero to N−1) multiple of the N-division of one clock cycle of the clock (N is a natural number equal to or greater than 2), based on the remaining (M-K) bits of data, including: a phase detector which detects which phase shift among N-division of one clock cycle, by performing predetermined logical operations on the L-bit transmission data received through the L lines; a first restoring portion which restores the (M-K) bit data based on the detected result from the phase detector; a converter which outputs K-bit data that indicates which transmission data among the L lines has transitioned by performing logical operations and by an encoding process on the L-bit transmission data received through the L lines; and, a second restoring portion which restores the K-bit data output from the converter.

The transmission system according to an exemplary aspect of the invention resides in a transmission system for transmitting transmission data from a first semiconductor chip to a second semiconductor chip via a single inter-chip interconnection, wherein the first semiconductor chip includes: a multiplied clock generator which generates a multiplied clock that is obtained by multiplying the frequency of a clock by N (N is a natural number equal to or greater than 2); a counter which counts the multiplied clock to obtain a count value, which makes one round in one clock cycle of the clock; a comparator which compares the count value on the counter with 2- or greater-bit value of data to be transmitted; a first control signal generator which generates a first control signal which is obtained by halving the frequency of the clock and inverting the frequency-halved clock alternately at every clock cycle of the clock; and, a data generator which generates, as transmission data, data that has one rising or falling transition of the amplitude of the data in each clock cycle of the clock and that carries a 2- or greater-bit value, making use of a phase from the edge of the clock to the transition in amplitude of the data, by alternately selecting a signal having the same polarity with the output signal that represents the size-compared result from the comparator and from the polarity-inverted signal at each clock cycle of the clock, in accordance with the first control signal, the second semiconductor chip includes: a second control signal generator which generates a second control signal by halving the frequency of the clock and by inverting the frequency-halved clock at each clock cycle of the clock; a selector which alternately selects a signal having the same polarity with data received from the first semiconductor chip through the inter-chip interconnection with and the inverted signal thereof at each clock cycle of the clock, in accordance with the second control signal; a down-counter that is reset by the signal output from the selector, which detects the phase from the edge of the clock to a transition in amplitude of the data by down-counting the multiplied clock; and a restoring portion which restores data having the 2- or greater-bit value, based on the value on the down-counter.

The transmission system according to an exemplary aspect of the invention resides in a transmission system for transmitting transmission data from a first semiconductor chip to a second semiconductor chip via L inter-chip interconnections (L is a natural number equal to or greater than 2), wherein the first semiconductor chip includes: a multiplied clock generator which generates a multiplied clock that is obtained by multiplying the frequency of a clock by N (N is a natural number equal to or greater than 2); a counter which counts the multiplied clock to obtain a count value, and which makes one round in one clock cycle of the clock; a detector which detects, among M-bit data (M is a natural number equal to or greater than 2) to be transmitted, whether the (M-K) bit value (K is a natural number equal to greater than 1 and less than M) agrees with the count value on the counter; a decoder which outputs L signals based on the value of the remaining K bits of the M-bit data and which decodes the value of the K bits so that only one signal in the L signals takes a predetermined logical value in each clock cycle of the clock based on the value of the K bits; and, a data generator which, based on the output signal from detector and the L signals from the decoder, generates as the transmission data, L signals to be transmitted through the L interconnections, such that only one of the L signals to be transmitted through the L interconnections has a transition of the amplitude of the signal in each clock cycle of the clock and such that the rising or falling edge of the transition in amplitude of the signal is shifted by a phase that is equivalent to an integer (from zero to N−1) multiple of N-division of one clock cycle of the clock, the second semiconductor chip includes: a phase detector which detects which phase shift among the N-division of one clock cycle, by performing predetermined logical operations on the L-bit transmission data received from the first semiconductor chip through the L interconnections; a first restoring portion which restores the (M-K) bit data based on the detected result from the phase detector; a converter which outputs K-bit data that indicates which transmission data among the L interconnections has transitioned by performing logical operations and by an encoding process on the L-bit transmission data received from the first semiconductor chip through the L interconnections; and, a second restoring portion which restores the K-bit data output from the converter.

The above and other objects, features, and advantages of the present invention will become apparent from the following description with reference to the accompanying drawings which illustrate an example of the present invention.

DETAILED DESCRIPTION OF EXEMPLARY EMBODIMENT(S)

Next, the exemplary embodiments of the present invention will be described in detail with reference to the drawings.

The exemplary embodiment of the present invention is characterized in that data that has one rising or falling transition of the amplitude of the data in each clock cycle and that carries a 2- or greater-bit value, making use of the phase from a clock edge to the transition in amplitude of the data, is transmitted as a transmission signal. Also, the exemplary embodiment of the present invention is characterized in that rising and falling transitions in amplitude of the data are alternately transmitted every clock cycle. The exemplary embodiment of the present invention is also characterized in that a plurality of interconnections for transmission signals are provided and the transmission signal is made to transition in amplitude of the signal by selecting one interconnection in each clock cycle.

The First Exemplary Embodiment

Figure 5:
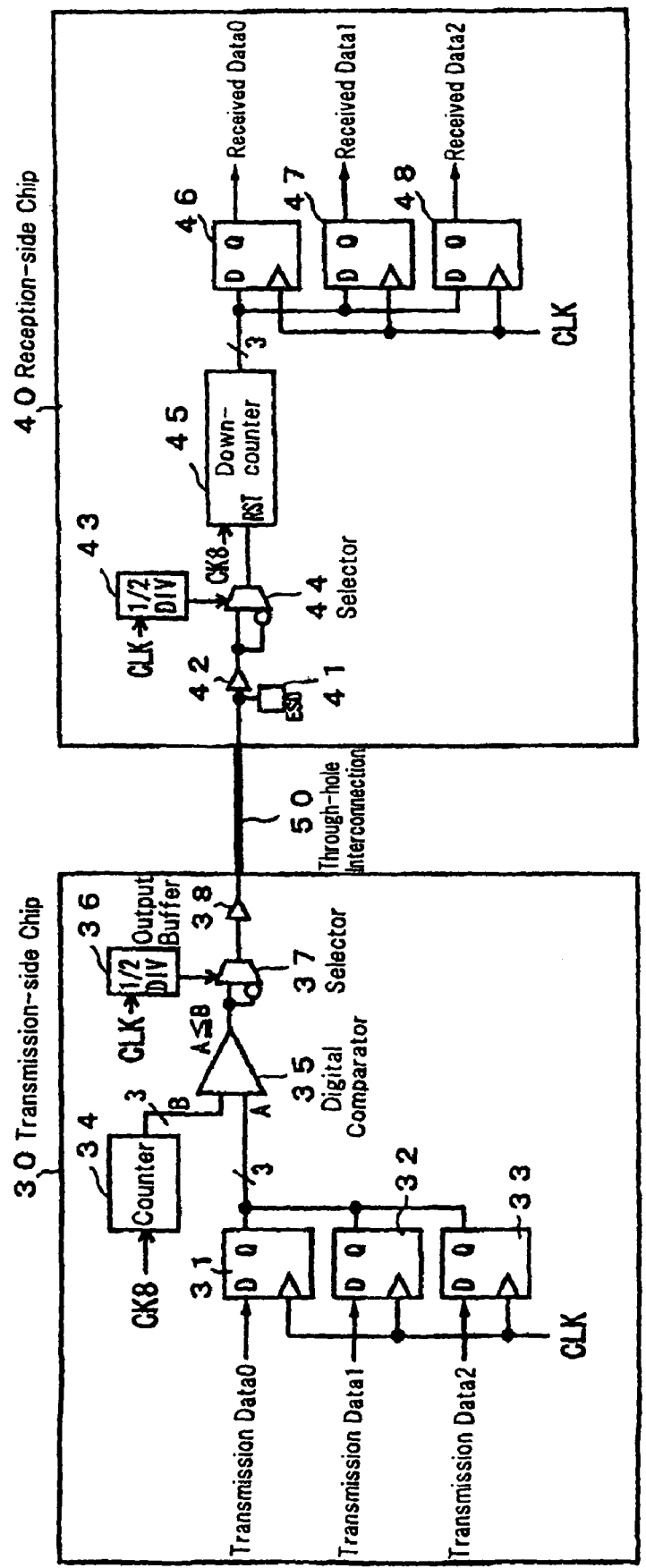
FIG. 5 is a block diagram showing the first exemplary embodiment of a transmission circuit and a transmission system of the present invention.

FIG. 5 is a block diagram showing the first exemplary embodiment of a transmission circuit and a transmission system according to the present invention. In this exemplary embodiment, a transmission system based on an 8-phase transmission scheme or a multi-phase transmission scheme using eight phases is used.

Figure 6:
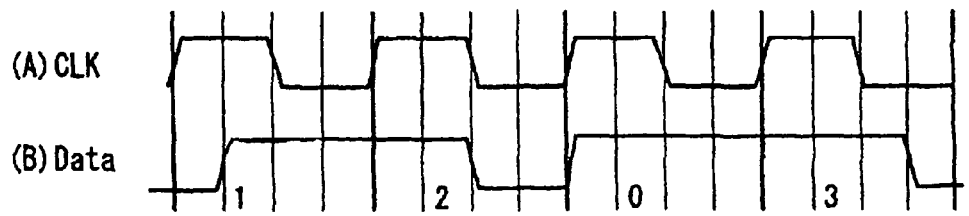
FIG. 6 is a transmission waveform diagram showing one example of a multi-phase transmission scheme.

First of all, a multi-phase transmission scheme will be described. FIG. 6 is a transmission waveform diagram showing one example of a multi-phase transmission scheme. FIG. 6(B) shows a 4-phase transmission waveform in which the time when a data edge takes place is shifted in accordance with the timing obtained by dividing the time axis of one clock cycle by four. That is, FIG. 6 shows a transmission waveform based on a multi-phase transmission scheme in which the phase from the rising edge of clock CLK shown in FIG. 6(A) to the rising edge (or falling edge) of the data amplitude shown in FIG. 6(B) is used.

Figure 4:
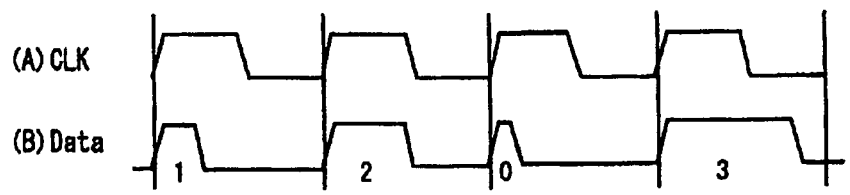
FIG. 4 is a waveform diagram of a pulse width modulation transmission.

In the 4-phase transmission scheme shown in FIG. 6, the same amount of data as the amount of transmission data in the pulse width modulation transmission scheme shown in FIG. 4 is transmitted through the same number of lines as the number of lines that are used in the pulse width modulation transmission scheme shown in FIG. 4. However, the number of times of charging/discharging in the 4-phase transmission scheme shown in FIG. 6 is reduced to half the number of times of charging/discharging in pulse width modulation transmission scheme shown in FIG. 4. The number of times of charging/discharging in this 4-phase transmission scheme is equal to the number of times of charging when the transmission circuit shown in FIG. 2 transmits 2-bit data. Accordingly, in order to reduce power consumption by reducing the number of times of charging/discharging compared to the number of times of charging and discharging in the transmission circuit for transmitting 2-bit data, greater phases than four phases should be used to perform transmission.

Figure 7:
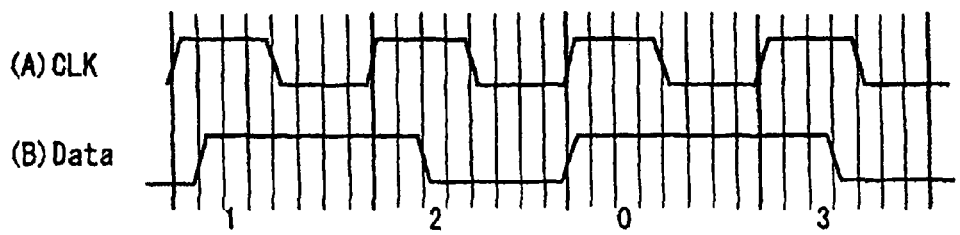
FIG. 7 is a waveform diagram showing one example of 8-phase transmission waveforms.

FIG. 7 is a waveform chart showing one example of an 8-phase transmission waveform. FIG. 7(B) shows an 8-phase transmission waveform in which the time when a data edge takes place is shifted in accordance with the timing obtained by dividing the time axis of one clock cycle by eight. That is, FIG. 7 shows a transmission waveform based on an 8-phase transmission scheme in which the phase from the rising edge of clock CLK shown in FIG. 7(A) to the rising edge (or falling edge) of the data amplitude shown in FIG. 7(B) is used. When data is transmitted based on an 8-phase transmission scheme using one chip-to-chip line, three-bit data can be transmitted, as will be described. Accordingly, in the 8-phase transmission scheme shown in FIG. 7, the number of times of charging/discharging with the chip-to-chip line is reduced to two-thirds of the number of times of charging/discharging when 2-bit data is transmitted using the digital transmission circuit shown in FIG. 2.

Further, in a case of a 16-phase transmission scheme, it is possible to transmit 4-bit data using one chip-to-chip line. Accordingly, the number of times of charging/discharging in the 16-phase transmission scheme can be reduced to half of the number of times of charging/discharging when 2-bit data is transmitted using the digital transmission circuit shown in FIG. 2. That is, it is possible to reduce power consumption.

Figure 9:
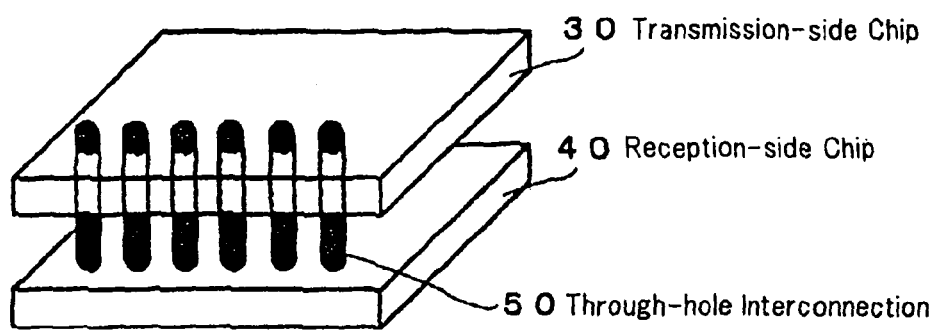
FIG. 9 is a perspective view showing a semiconductor device in which data is transmitted via through-hole interconnections between stacked semiconductor chips.

Returning to FIG. 5, description will be continued. In the transmission system of this exemplary embodiment, the semiconductor chip on the transmission side (which will be referred to hereinbelow as transmission-side chip), designated at 30, and the semiconductor chip on the reception side (which will be referred to hereinbelow as reception-side chip), designated at 40, are connected to each other via through-hole interconnection 50. Transmission-side chip 30 transmits data in an 8-phase transmission mode to reception-side chip 40 by way of through-hole interconnection 50. In reality, transmission-side chip 30 is stacked over reception-side chip 40 as schematically shown in the perspective view of FIG. 9, and through-hole interconnection 50 is used as the chip-to-chip interconnection between transmission-side chip 30 and reception-side chip 40. However, in FIG. 5, for description convenience, transmission-side chip 30 and reception-side chip 40 are illustrated side by side with only the necessary circuits for 3-bit data transmission and through-hole interconnection 50.

In FIG. 5, transmission-side chip 30 includes flip-flops 31, 32 and 33, counter 34, digital comparator 35, frequency divider 36, selector 37 and output buffer 38. In flip-flop 31, 1-bit transmission data Data0 is input to its data input terminal. In flip-flop 32, 1-bit transmission data Data1 is input to its data input terminal. In flip-flop 33, 1-bit transmission data Data2 is input to its data input terminal. Counter 34 counts clock CK8 pulses that are obtained by multiplying the frequency of clock CLK by eight. Digital comparator 35 compares the values of the 3-bit data respectively supplied to input terminals A and B. Frequency divider 36 halves the frequency of clock CLK to generate a control signal. Selector 37 selects either the output signal from digital comparator 35 or its polarity-inverted output.

On the other hand, reception-side chip 40 includes ESD protecting element 41, input buffer 42, frequency divider 43, selector 44, down counter 45, flip-flops 46, 47 and 48. ESD protecting element 41 is connected to the input terminal of chip 40. Input buffer 42 buffers and amplifies the received data. Frequency divider 43 halves the frequency of clock CLK to generate a control signal. Selector 44 selects either the signal from input buffer 42 or its polarity-inverted signal. Down counter 45 down-counts clock CK8 pulses that are obtained by multiplying the frequency of clock CLK by eight. Individual bits of the 3-bit output signal from down counter 45 are supplied to the associated data input terminals of Flip-flops 46, 47 and 48, respectively.

Figure 8:
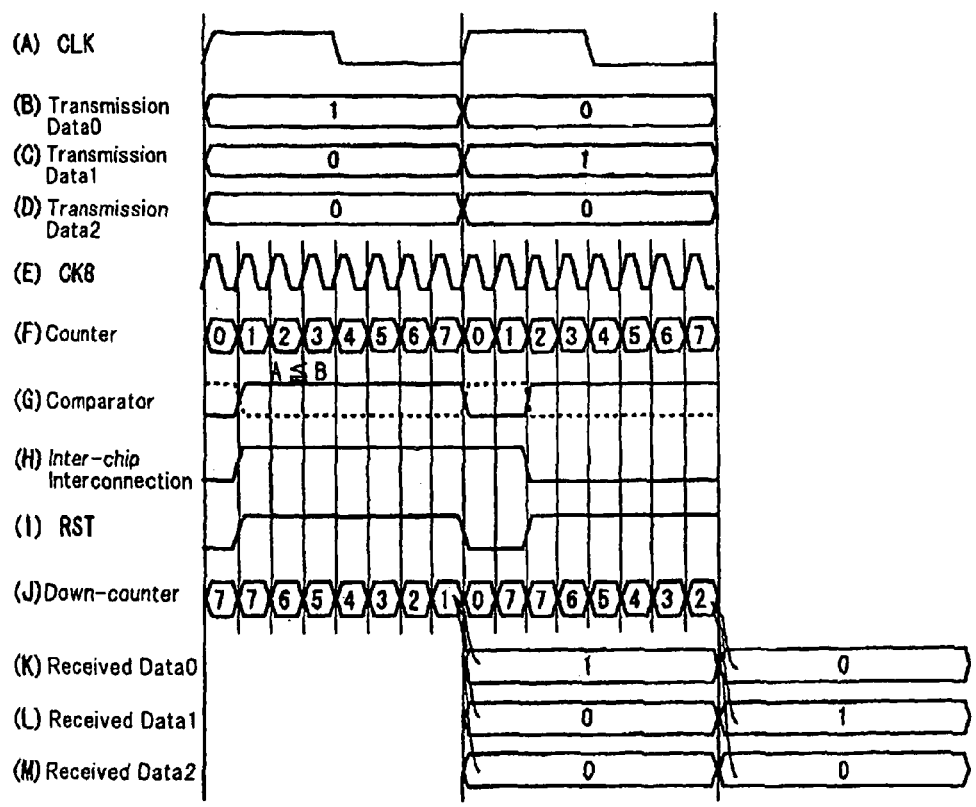
FIG. 8 is a timing chart for illustrating the operation of the transmission system shown in FIG. 5.

Next, the operation of the present exemplary embodiment will be described referring to the flow chart shown in FIG. 8. First, in transmission-side chip 30, 3-bit transmission data is handled as 1-bit transmission data 0, 1 and 2 as shown in FIGS. 8(B), 8(C) and 8(D). Transmission data 0, 1 and 2 are taken up by flip-flops 31, 32 and 33 in synchronization with the rise of clock CLK shown in FIG. 8(A). Then, transmission data 0, 1 and 2 are supplied to input terminal A of digital comparator 35 as 3-bit data.

On the other hand, 8-bit counter 34 up-counts clock CK 8 pulses shown in FIG. 8(E), so as to increase its count from "0" by increments of one as shown in FIG. 8(F). When the count on counter 34 reaches "7" and another clock CK 8 pulse is counted, the count is returned to "0". Counter 34 supplies a 3-bit count value, which makes one round from "0" to "7", to digital comparator 35. Digital comparator 35 compares the value of the 3-bit transmission data supplied to input terminal A from flip-flops 31 to 33 with the 3-bit count value supplied to input terminal B from counter 34. When the input value to input terminal A is equal to or less than the input value to input terminal B, in other words, when the count value is equal to or greater than the value of the 3-bit transmission data, digital comparator 35 outputs the high-level signal as shown in FIG. 8(G). Otherwise, digital comparator 35 outputs the low-level signal.

Selector 37 alternately selects the signal having the same polarity with the signal output from digital comparator 35 and with the polarity-inverted signal at every clock cycle, based on the control signal from frequency divider 36. Accordingly, selector 37 outputs a signal having a waveform with one transition in amplitude of the signal, either rising or falling, during one clock cycle, specifically the signal shown in FIG. 8(H). Here, the aforementioned count value represents the phase (the phase based on the divided unit that is obtained by dividing one clock cycle or 180 degrees by 8) from a clock edge to the rising edge or falling edge of the data. Based on the position (phase) at which a transition in amplitude of the output signal from selector 37 takes place, it is possible to identify the 3-bit data value having a value ranging from "0" to "7". Output buffer 38 outputs the signal output from selector 37 to through-hole interconnection 50 outside transmission-side chip 30.

In reception-side chip 40, input buffer 42 receives the signal shown in FIG. 8(H) from through-hole interconnection 50, and supplies the signal as the received data to selector 44. Selector 44 alternately selects the signal having the same polarity with the signal supplied from input buffer 42 and with its polarity-inverted signal every clock cycle, based on the control signal from frequency divider 43, and supplies the selected signal to reset terminal RST of down counter 45. FIG. 8(I) shows the signal (which will be also called hereinbelow the reset signal) supplied to reset terminal RST of down counter 45.

Down counter 45 down-counts clock CK8 pulses shown in FIG. 8(E). Down counter 45 outputs "7" which is the maximum 3-bit value when the reset signal is at the low level. When the reset signal is at the high level, down counter 45 starts reducing the count from "7" by decrements of one in synchronization with clock CK8. When the count on down counter 45 reaches "0" and another clock CK8 pulse is counted under the condition in which the reset signal is at the high level, the count is returned to "7". Down counter 45 outputs a 3-bit count value, which makes one round from "7" to "0". Resetting of down counter 45 is done in clock synchronous mode. Accordingly, the count value on down counter 45 is reset by the next clock after the reset value has changed.

According to this arrangement, down counter 45 outputs 3-bit signals having values shown in FIG. 8(J). Individual bits of the 3-bit signal are supplied to associated data input terminals of flip-flops 46, 47 and 48, respectively. Supplied to the clock terminals of flip-flops 46, 47 and 48 is common inter-chip synchronization clock CLK shown in FIG. 8(A). Flip-flops 46, 47 and 48 take up the signal supplied at their data input terminal at the rising timing, for example, of this inter-chip synchronization clock CLK. As a result, as shown in FIGS. 8(K), 8(L) and 8(M), 1-bit data having the same value as that of 1-bit transmission data 0, 1 and 2 transmitted from transmission-side chip 30 is output from Q-terminals of flip-flops 46, 47 and 48. Three-bit data is restored from the data from the Q-output terminals of flip-flops 46, 47 and 48. Thereafter, the 3-bit data is sent to an internal circuit (not shown) of reception-side chip 40.

According to the present exemplary embodiment, transmission data having a waveform with one transition in amplitude in each clock cycle is transmitted in an 8-phase transmission mode to reception-side chip 40 by way of through-hole interconnection 50. Accordingly, it is possible to transmit 3-bit data from transmission-side chip 30 to reception-side chip 40 under the condition in which charging/discharging of through-hole interconnection 50 occurs once every clock cycle. Therefore, according to the present exemplary embodiment, it is possible to reduce the number of times of charging/discharging of the interconnection to two-thirds of that of the transmission circuit for transmitting 3-bit data via three through-hole interconnections. As a result, it is possible to achieve inter-chip data transmission using the chip-to-chip interconnection of through-hole interconnection 50 having a large capacitance and ESD protecting element 41 using low power consumption.

That is, according to the present exemplary embodiment, even if through-hole interconnection is used to transmit data between chips, it is possible to reduce the number of times of charging/discharging the chip-to-chip interconnection in each clock cycle compared to the case of 1-bit (binary) digital data being transmitted, using neither multiple power sources as used in a multi-level transmission mode nor a high-speed clock or high-speed delay control that is needed in a pulse width modulation data transmission mode. Therefore, according to the present exemplary embodiment it is possible to reduce power consumption.

Figure 1:
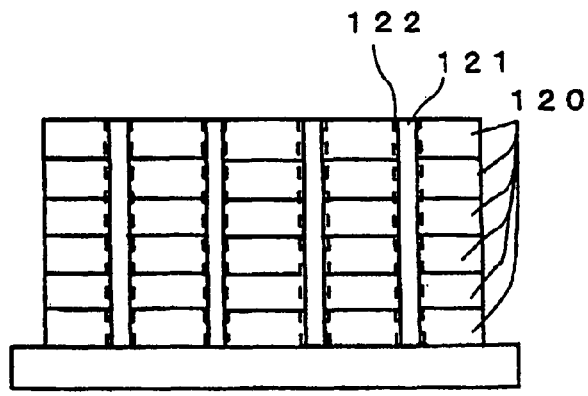
FIG. 1 is a schematic sectional diagram showing a chip-stacked type three-dimensional semiconductor.
Figure 2:
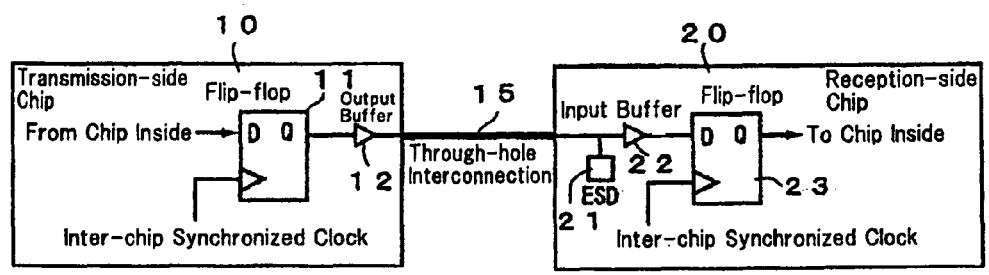
FIG. 2 is a configurational diagram showing one example of a digital transmission circuit.
Figure 3:
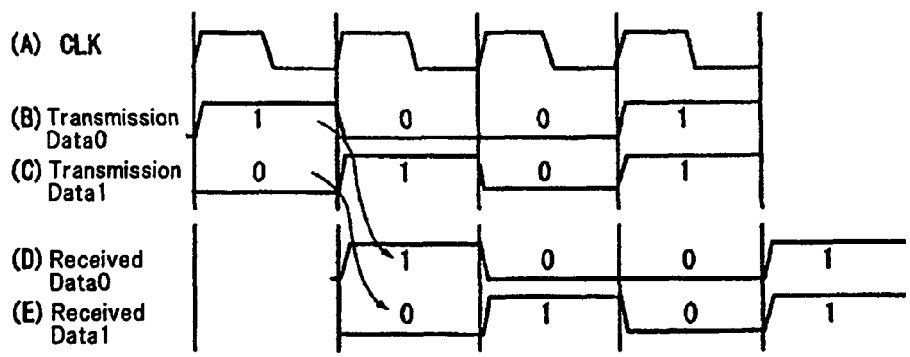
FIG. 3 is a diagram showing waveforms of a 2-bit transmission in digital transmission.

Though in the present exemplary embodiment, an 8-phase transmission mode is used, a multi-phase mode having a number of phases greater than four phases may be used in order to reduce the number of times of charging/discharging to be lower than that of the digital transmission circuit shown in FIG. 2. For example, in the 16-phase transmission mode, data of four bits can be transmitted during one clock cycle by a single charging or discharging. Accordingly, in the 16-phase transmission mode, the number of times of charging/discharging is halved compared to the number of times of charging/discharging in the digital transmission circuit shown in FIG. 2. As a result, in the 16-phase transmission mode, it is possible to further reduce power consumption compared to the case in the 8-phase transmission mode.

The Second Exemplary Embodiment

Figure 10:
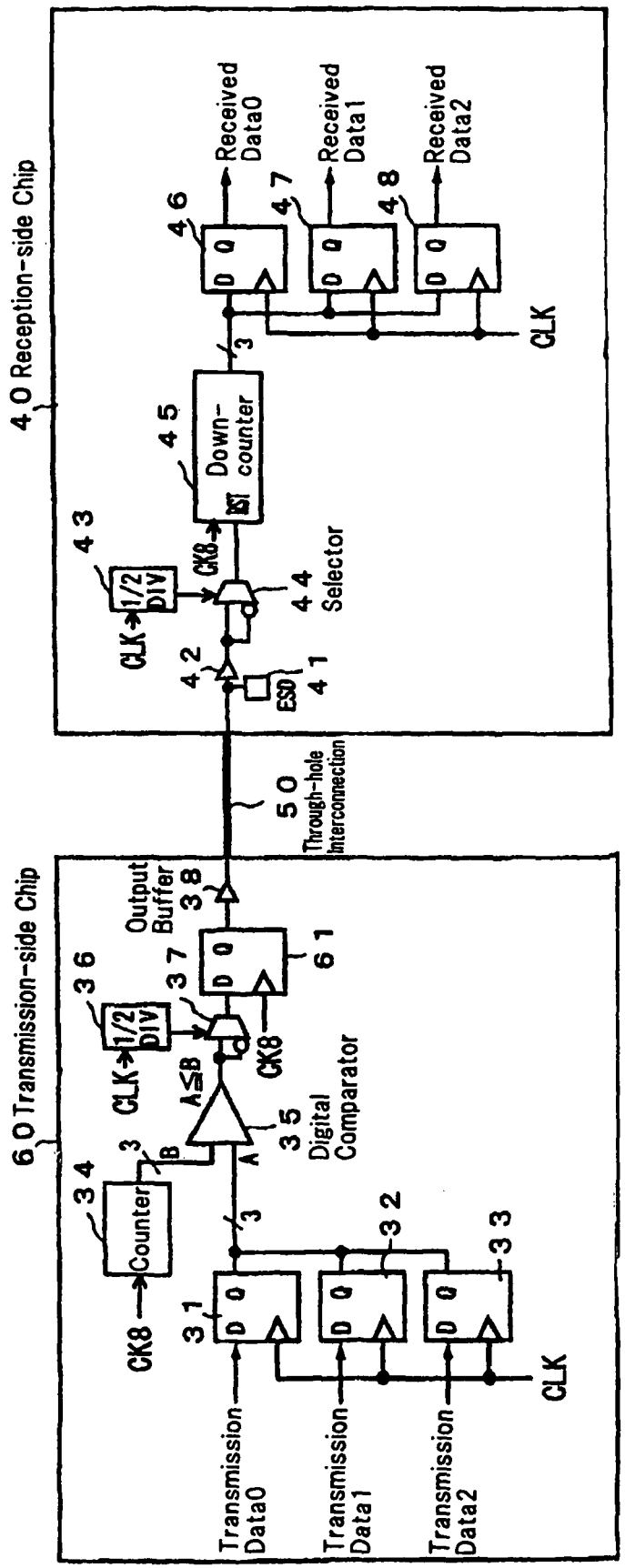
FIG. 10 is a block diagram showing the second exemplary embodiment of a transmission circuit and a transmission system of the present invention.

FIG. 10 is a block diagram showing the second exemplary embodiment of a transmission circuit and a transmission system according to the present invention. In FIG. 10, the same components as those shown in FIG. 5 are allotted with the same reference numerals and their description is omitted. Also in this exemplary embodiment, similar to the first exemplary embodiment, a transmission system operated in a multiphase transmission mode using eight phases, i.e., an 8-phase transmission mode is used. The present exemplary embodiment, compared to the first exemplary embodiment shown in FIG. 5, is characterized in that a flip-flop 61 whose clock input terminal receives an 8-multiplied clock CK8 is inserted between selector 37 and output buffer 38 in transmission-side chip 60.

Figure 11:
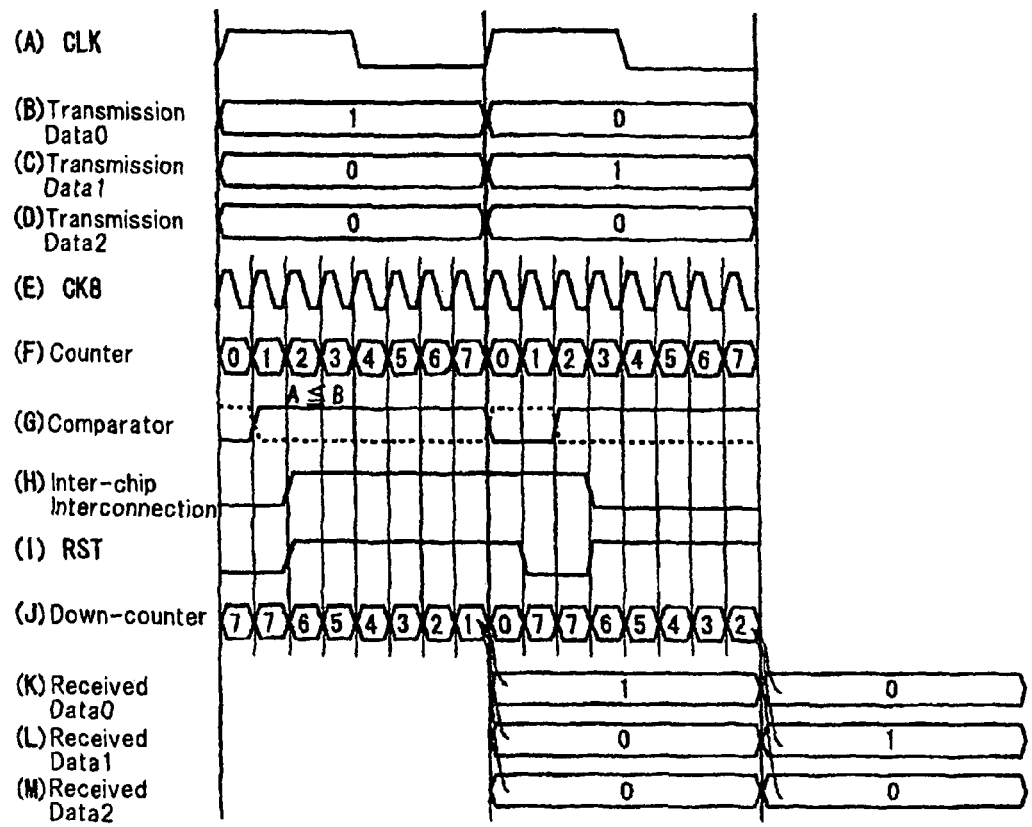
FIG. 11 is a timing chart for illustrating the operation of the transmission system shown in FIG. 10.

FIG. 11 is a diagram showing signal waveforms of the at different components in the transmission system shown in FIG. 10. In Clock CLK shown in FIG. 11(A), in 3-bit transmission data shown in FIGS. 11(B) to (D), in 8-multiplied clock CK8 shown in FIG. 11(E), the output counter value from counter 35 shown in FIG. 11(F), the output signal from digital comparator 35 shown in FIG. 11(G) are the same as the corresponding signals in FIGS. (A) to 8(G), respectively. The signals shown in FIGS. 11(J) to 11(M) are the same as the corresponding signals shown in FIGS. 8(J) to 8(M). Provision of flip-flop 61 makes it possible to prevent a noise pulse occurring upon switching of selector 37 from overlapping the output waveform from output buffer 38 to through-hole interconnection 50.

However, it should be noted that in the present exemplary embodiment, the addition of flip-flop 61 changes the waveform of the transmission data between chips, that is, the waveform of the signal output from flip-flop 61 to through-hole interconnection 50 via output buffer 38, into that shown in FIG. 11(H). Correspondingly, the waveform of the reset signal of down counter 45 also becomes that as shown in FIG. 11(I). These signals delay one-eighth of one clock cycle of clock CLK. To deal with this, in the present exemplary embodiment, resetting down counter 45 on the reception side is operated in clock asynchronous mode, so that the output of the counter value is reset as soon as the reset value has changed.

The Third Exemplary Embodiment

Figure 12:
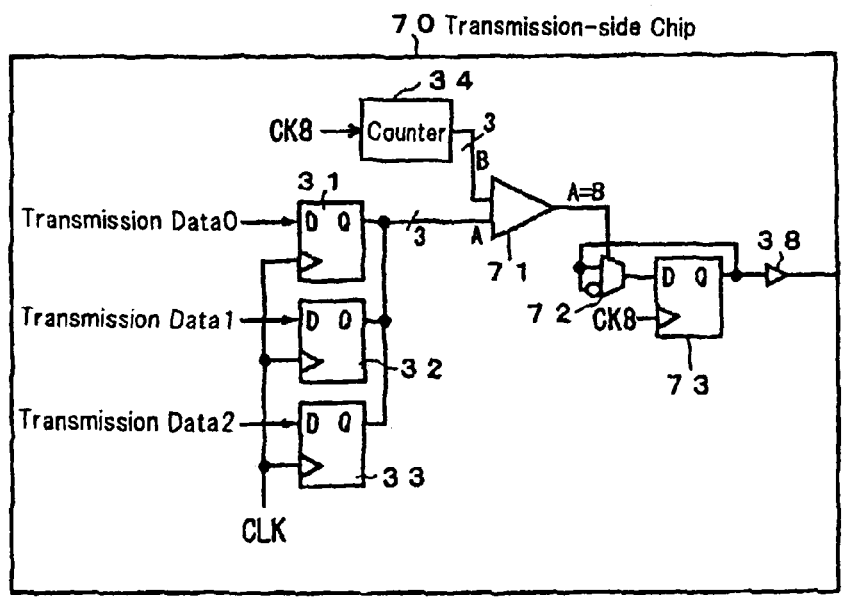
FIG. 12 is a block diagram showing a transmission-side chip of the third exemplary embodiment of a transmission circuit and a transmission system of the present invention.

FIG. 12 is a block diagram showing a transmission-side chip in the third exemplary embodiment of a transmission circuit and a transmission system according to the present invention. In FIG. 12, the same components as those shown in FIG. 5 are allotted with the same reference numerals and their description is omitted. Transmission-side chip 70 in this exemplary embodiment includes digital comparator 71. Digital comparator 71 compares 3-bits of data made up of data from flip-flops 31, 23 and 33 with the 3-bit up-count value generated by counter 34. When the two data have the same value, digital comparator 71 outputs the high-level signal.

Figure 13:
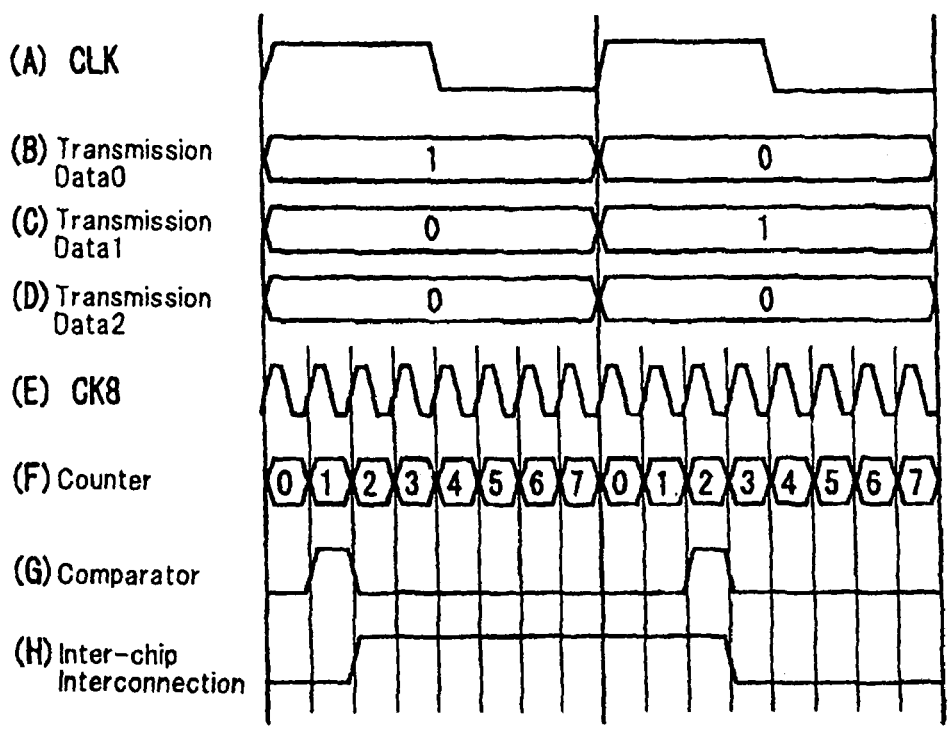
FIG. 13 is a timing chart for illustrating the operation of the transmission system shown in FIG. 12.

FIG. 13(A) shows the waveform of clock CLK. FIG. 13(B) to 13(D) show 3-bit transmission data Data0 to Data2. FIG. 13(E) shows the waveform of clock CK8. FIG. 13(F) shows the output count value from counter 34. As a result, the output signal from digital comparator 71 gives a high-level output only when the value of the 3-bit transmission data coincides with the output count value from counter 34.

In FIG. 12, the output signal from digital comparator 71 is supplied to selector 72 as its control signal. Selector 72 supplies the output signal, which is output from selector 72, to the data input terminal of flip-flop 73. In flip-flop 73, clock CK8 is supplied to the clock input terminal. Flip-flop 73 supplies the output signal, which is output, from the Q-output terminal to each of output buffers 38, the non-inverted input terminal to selector 72 and inverted input terminal to selector 72. Selector 72 supplies the signal, which is produced by inverting the polarity of the signal output from flip-flop 73 (i.e., the signal input through the inverted input terminal) to the data input terminal, to flip-flop 73 when the control signal from digital comparator 71 has transitioned to the high level. As a result of the above, flip-flop 73 outputs the signal shown in FIG. 13(H) as transmission data. The waveform of this transmission data has the same waveform as that of the transmission data in the second exemplary embodiment shown in FIG. 11(H).

In the exemplary embodiment, the reception-side chip that receives the transmission data output from transmission-side chip 70 via the through-hole interconnection has the same configuration as that of reception-side chip 40 shown in FIG. 10. Also, the signal waveforms at the associated components in the reception-side chip are the same as those shown in FIG. 11.

Also in the present exemplary embodiment, provision of flip-flop 73 makes it possible to prevent a noise pulse occurring upon switching of selector 72 from overlapping the output waveform from output buffer 38 to the through-hole interconnection.

The Fourth Exemplary Embodiment

Figure 14:
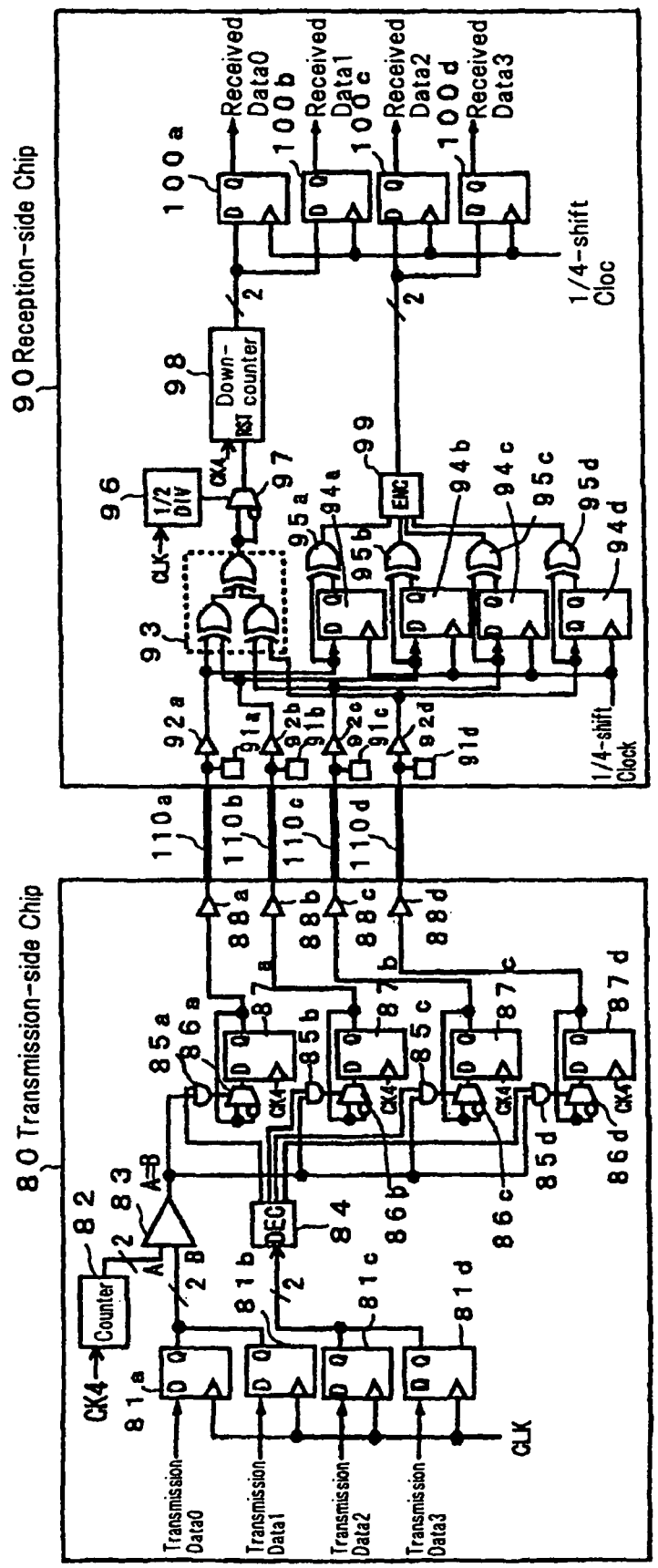
FIG. 14 is a block diagram showing the fourth exemplary embodiment of a transmission circuit and a transmission system of the present invention.

FIG. 14 is a block diagram showing the fourth exemplary embodiment of a transmission circuit and a transmission system of the present invention. In the present exemplary embodiment, in addition to the multi-phase transmission mode in each of the above exemplary embodiments, a multi-line transmission mode using line selection is used in combination in order to further reduce the number of times of charging/discharging.

First, a case where a multi-line transmission mode is combined with a multi-phase transmission mode will be described with reference to the waveform chart in FIG. 15. In a multi-phase transmission mode, data on one line will necessarily change in amplitude, either rising or falling, within one clock cycle. In contrast, when a multi-line transmission mode is combined, a plurality of lines are provided, and one of the multiple lines is selected for each clock cycle. The data on the selected line changes in amplitude, either rising or falling so as to add the information on which line is used.

Figure 15:
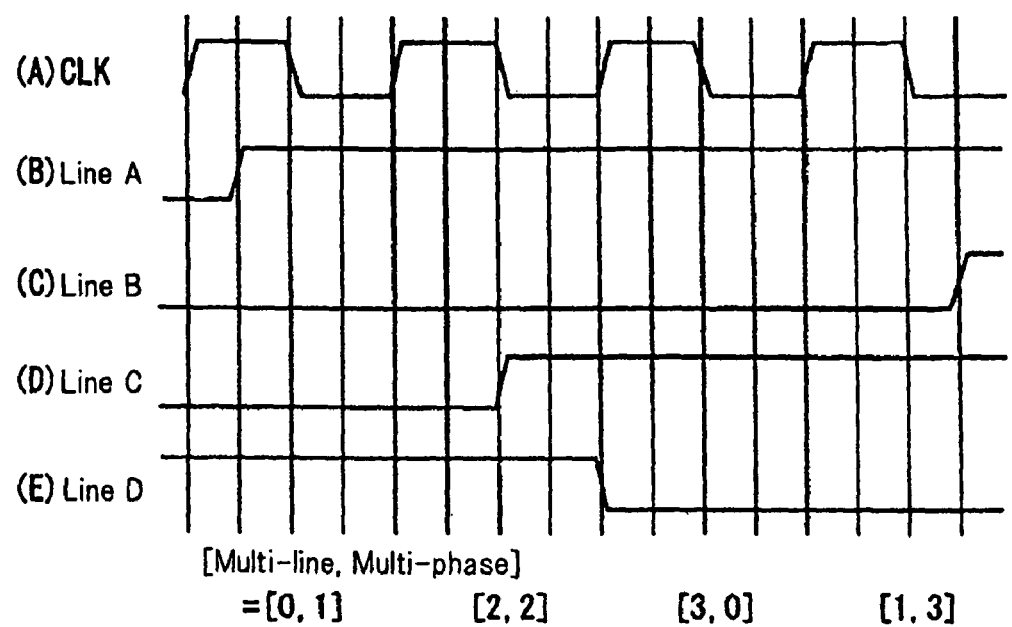
FIG. 15 is a waveform chart for illustrating an operation when a multi-line transmission scheme is applied to a multi-phase transmission scheme of the present invention.

In the case shown in FIG. 15, the number of the clock cycle, among the four consecutive clock cycles of clock CLK shown in FIG. 15(A), in which a rising or falling transition in amplitude of the transmission data occurs, indicates which line is being used among the four chip-to-chip lines A to D. Therefore, if the transmission data rises in the first clock cycle shown in FIG. 15(A), line A is selected as shown in FIG. 15(B); if the transmission data rises in the second clock cycle, line C is selected as shown in FIG. 15(D); if the transmission data falls in the third clock cycle, line D is selected as shown in FIG. 15(E); and if the transmission data rises in the fourth clock cycle, line B is selected as shown in FIG. 15(C). A signal rising edge or falling edge is generated on the selected line so as to transmit data, whereby the data is transmitted.

In the multi-line transmission scheme based on this line selection, data equivalent to two bits is transmitted in each clock cycle. Further, when 4-phase transmission mode is also used at the same time, another two bit-equivalent information can be carried by varying the phase of the rising or falling edge in each cycle. Accordingly, in the 4-phase 4-line transmission mode, it is possible to transmit data equivalent to four bits in total in each clock cycle by one charging/discharging of the interconnection. Accordingly, despite the time axis of one clock cycle being divided into just four, it is possible to halve the number of times of charging/discharging to transmit the same amount of data, compared to the number of times of charging/discharging for the digital transmission circuit shown in FIG. 2, hence it is possible to reduce power consumption.

Returning to FIG. 14, description will be continued. The present exemplary embodiment is a transmission system based on the 4-phase 4-line transmission mode in which transmission-side chip 80 transmits 4-bit transmission data to reception-side chip 90 using four through-hole interconnections 110a to 110d. In the present exemplary embodiment, transmission-side chip 80 or a semiconductor chip is stacked over reception-side chip 90 or another semiconductor chip with through-hole interconnections being used as the chip-to-chip interconnection. However, in FIG. 14, for description convenience, transmission-side chip 80 and reception-side chip 90 are illustrated side by side with only the necessary circuits for 4-bit data transmission and chip-to-chip lines.

Transmission-side chip 80 includes flip-flops 81a, 81b, 81c and 81d, counter 82, digital comparator 83, decoder (DEC) 84, AND circuits 85a, 85b, 85c and 85d, selectors 86a, 86b, 86c and 86d, flip-flops 87a, 87b, 87c and 87d, and output buffers 88a, 88b, 88c and 88d. In flip-flop 81a, 1-bit transmission data Data0 is input to its data input terminal. In flip-flop 81b, 1-bit transmission data Data1 is input to its data input terminal. In flip-flop 81c, 1-bit transmission data Data2 is input to its data input terminal. In flip-flop 81d, 1-bit transmission data Data3 is input to its data input terminal. Counter 82 counts clock CK4 pulses that are obtained by multiplying the frequency of clock CLK by four. Digital comparator 83 detects agreement/disagreement between the values of 2-bit data input respectively to input terminals A and B. Decoder (DEC) 84 decodes 2-bit data to output 4-bit data. AND circuits 85a, 85b, 85c and 85d each produce the logical product between each bit from decoder 84 and the output signal from digital comparator 83. Flip-flops 87a, 87b, 87c and 87d take up respective output signals from selectors 86a, 86b, 86c and 86d in synchronization with clock CK4.

On the other hand, reception-side chip 90 includes ESD protecting elements 91a, 91b, 91c and 91d, input buffer 92a, 92b, 92c and 92d, two-layered exclusive-OR (which will be written to hereinbelow as XOR) circuit 93, flip-flops 94a, 94b, 94c and 94d, two-input XOR circuits 95a, 95b, 95c and 95d, frequency divider 96, selector 97, down counter 98, encoder (ENC) 99, flip-flops 100a and 100b, and flip-flops 100c and 100d. ESD protecting element 91a is connected to the input terminal connected to through-hole interconnection 110a. ESD protecting element 91b is connected to the input terminal connected to through-hole interconnection 110b. ESD protecting element 91c is connected to the input terminal connected to through-hole interconnection 110c. ESD protecting element 91d is connected to the input terminal connected to through-hole interconnection 110d. Input buffers 92a, 92b, 92c and 92d buffer amplify each one bit of the received data. Flip-flops 94a, 94b, 94c and 94d operate in synchronization with ¼-shift CLK that is obtained by shifting the phase of clock CLK by ¼ period. Supplied to 2-input XOR circuit 95a are the input signal to flip-flop 94a and the output signal from flip-flop 94a. Supplied to 2-input XOR circuit 95b are the input signal to flip-flop 94b and the output signal from flip-flop 94b. Supplied to 2-input XOR circuit 95c are the input signal to flip-flop 94c and the output signal from flip-flop 94c. Supplied to 2-input XOR circuit 95d are the input signal to flip-flop 94d and the output signal from flip-flop 94d. Frequency divider 96 halves the frequency of clock CLK to generate a control signal for inverting clock CLK at every clock cycle of clock CLK. Selector 97 selects either the output signal from XOR circuit 93 or its polarity-inverted signal. Down counter 98 down-counts clock CK4 pulses that are obtained by multiplying the frequency of clock CLK by four. Encoder (ENC) 99 encodes the output signals from XOR circuits 95a to 95d. Individual bits of the 2-bit output signal from down counter 98 are supplied to the associated data input terminals of flip-flops 100a and 100b. Individual bits of the 2-bit output signal from encoder 99 are supplied to the associated data input terminals of flip-flops 100c and 100d.

Next, the operation of the present exemplary embodiment will be described referring to the timing chart shown in FIG. 16. First, in transmission-side chip 80, flip-flops 81a, 81b, 81c and 81d take up respective 1-bit data Data0, Data1, Data2 and Data3 (FIGS. 16(B), 16(C), 16(D) and 16(E)) in synchronization with the rise of clock CLK shown in FIG. 16(A). Here, 4-bit transmission data is assumed so that Data0 is LSB and Data3 is MSB.

Because of the 4-phase transmission mode, among all the 1-bit transmission data taken up by flip-flops 81a, 81b, 81c and 81d, two bits of transmission data on the lower digit side are supplied to input terminal B to digital comparator 83 from flip-flops 81a and 81b while two bits of transmission data on the upper digit side are supplied to decoder 84 from flip-flops 81c and 81d.

Digital comparator 83 detects whether the 2-bit count value, shown in FIG. 16(G), output from counter 82 that up-counts clock CK4 shown in FIG. 16(F) agrees with the value of the two bits of transmission data on the lower digit side output from flip-flops 81a and 81b. Digital comparator 83 outputs the high-level signal when the two agree with each other and outputs the low-level signal when the two do not agree with each other, as shown in FIG. 16(H).

Because of the 4-phase transmission mode, decoder 84 decodes the input data such that, based on the value of 2-bit transmission data on the upper digit side output from flip-flops 81c and 81d among the 4-bit transmission data, one of the four output signals will take the high level in each clock cycle of clock CLK. AND circuits 85a to 85d each compute the logical product between one of the four output signals from decoder 84 and the signal output from digital comparator 83 and supply the output signals separately to selectors 86a to 86d as their control signals.

In selectors 86a to 86d, the Q-output signal from each of flip-flops 87a to 87d that operate in synchronization with clock CK4 is supplied to the non-inverted input terminal and the inverted input terminal of the associated selector. Each of selectors 86a to 86d outputs the Q-output signal that is input to the inverted input terminal when the control signal becomes high and outputs the Q-output signal that is input to the non-inverted input terminal when the control signal is at the low level. Flip-flops 87a to 87d take up the output signals from respective selectors 86a to 86d in synchronization with clock CK4. Thereafter, the output signals from selectors 86a to 86d are output from the Q-output terminals of flip-flops 87a to 87d, passing through output buffers 88a to 88d, to through-hole interconnections 110a to 110d outside transmission-side chip 80.

Figure 16:
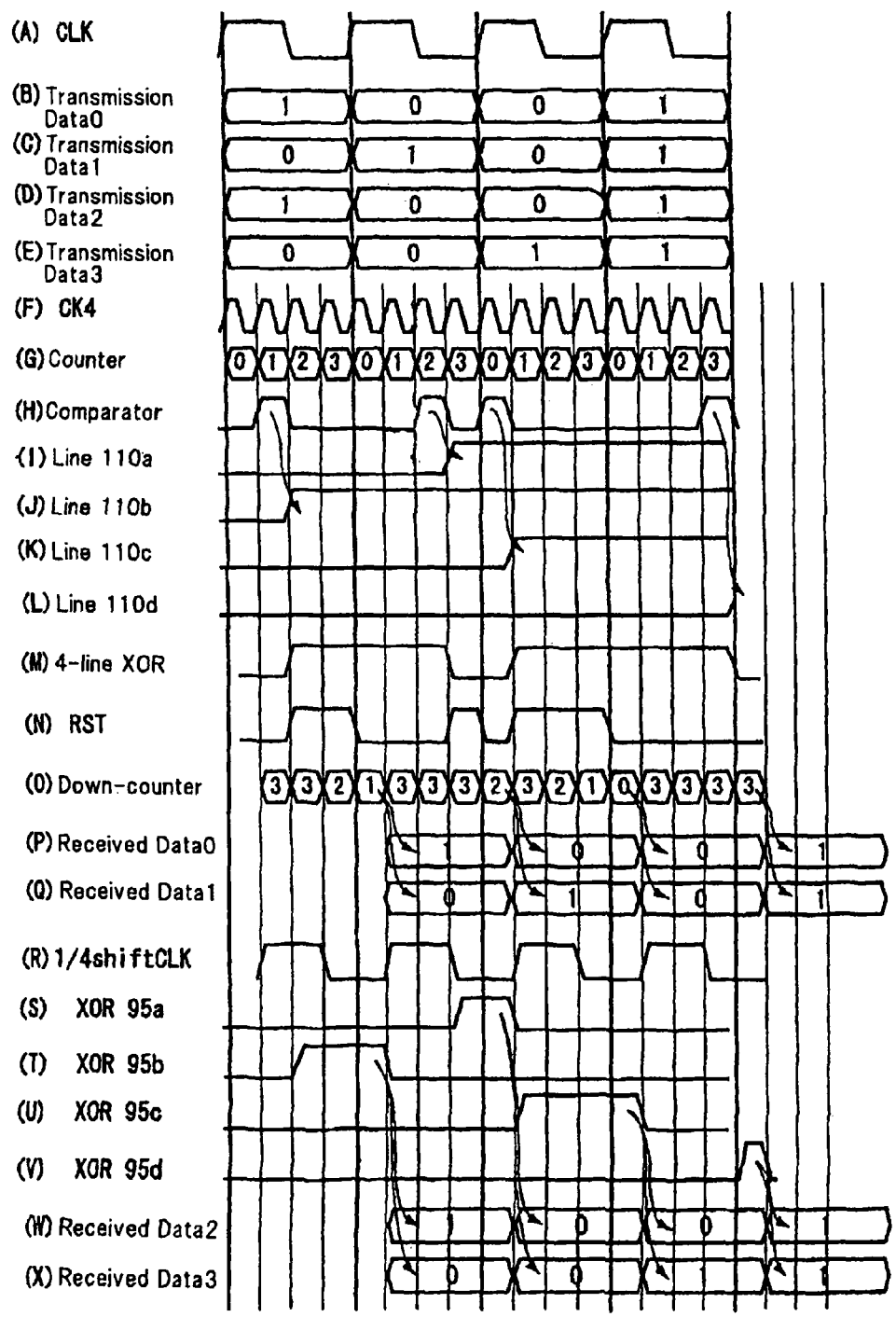
FIG. 16 is a timing chart for illustrating the operation of the transmission system shown in FIG. 14.

As a result, only one of the signals among the signals transmitted through four through-hole interconnections 110a to 110d changes its amplitude during one clock cycle of clock CLK, as seen in FIGS. 16(1), 16(J), 16(K) and 16(L). The difference in phase from the clock's rising edge to the rising edge or falling edge of the signal falls in any one of the four phases.

In reception-side chip 90, input buffers 92a to 92d receive the signals supplied from four through-hole interconnections 110a to 110d, as the received data. In order to recover 4-bit digital data equivalent to the transmission data, which existed inside transmission-side chip 80, from the received data, reception-side chip 90 restores two bits of data from four the phase transmission and two bits of data from four lines.

In order to restore two bits of data from the 4-phase transmission, reception-side chip 90 uses a circuit portion composed of two-layered XOR circuit 93, frequency-divider 96, selector 97, down counter 98 and flip-flops 100a and 100b. That is, first, two-layered XOR circuit 93 outputs a signal whose amplitude changes as shown in FIG. 16(M) when one of the four received data that are output from input buffers 92a to 92d has transitioned in amplitude. The output signal from XOR circuit 93 is supplied to the inverted terminal and non-inverted terminal of selector 97. Selector 97 selects the output signal from XOR circuit 93 and its polarity-inverted signal alternately at every clock cycle, based on the control signal from frequency divider 96, and supplies the selected result to reset terminal RST of down counter 98.

Down-counter 98 outputs "3" the maximum 2-bit value when the reset signal shown in FIG. 16(N) supplied from selector 97 to reset terminal RST is at the low level. When the reset signal becomes high, down counter 98 starts counting down in synchronization with clock CK4. Accordingly, down counter 98 outputs 2-bit signals presenting the count values shown in FIG. 16(O). In flip-flops 100a and 100b, each one bit of the aforementioned 2-bit signal output from down counter 98 is supplied to the data input terminal. Flip-flops 100a and 100b each take up the data supplied to the data input terminal at the time when the ¼-shift CLK shown in FIG. 16(R), obtained by shifting the phase of clock CLK by ¼ clock cycle, rises. Then, flip-flops 100a and 100b output the taken data from their output terminals. As a result, 1-bit signals shown in FIGS. 16(P) and 16(Q) are forwarded from the Q-output terminals of flip-flops 100a and 100b to the circuit (not shown) inside reception-side chip 90. Thus, the signal sent by 4-phase transmission is restored into the lower two bits of the original digital signal.

On the other hand, reception-side chip 90, in order to restore two bits of data from the 4-line transmission, uses a circuit portion composed of flip-flops 94a to 94d, XOR circuits 95a to 95d, encoder 99 and flip-flops 100c and 100d. That is, first, flip-flops 94a to 94d each receive 1-bit received data from respective input buffers 92a to 92d and output them in synchronization with ¼-shift CLK. Subsequently, XOR circuits 95a to 95d receive, as their input, the output signals from the Q-output terminals of the aforementioned flip-flops 94a to 94d and the received data supplied to the data input terminals to flip-flops 94a to 94d, and output a high-level signal when the signal value from the Q-output terminal changes from that of the previous one clock cycle. Accordingly, the output signals from XOR circuits 95a, 95b, 95c and 95d result in those shown in FIGS. 16(S), 16(T), 16(U) and 16(V).

Encoder 99 receives, as its input, the signals output from XOR circuits 95a, 95b, 95c and 95d, and converts the input signal into 2-bit data that indicates in which transmission signal, among the transmission signals from four through-hole interconnections 110a to 110d, the amplitude has changed. That is, encoder 99 outputs 2-bit data "00" when the output signal from XOR circuit 95a alone among the output signals from XOR circuits 95a to 95d, is at the high level, "10" when the output signal from XOR circuit 95b alone is at the high level, "01" when the output signal from XOR circuit 95c alone is at the high level, and "11" when the output signal from XOR circuit 95d alone is at the high level.

Supplied respectively to the data input terminals of flip-flops 100c and 100d are the first and second bits of the above 2-bit data output from encoder 99. Flip-flops 100c and 100d pick them up at the time when the ¼-shift CLK rises and output them from their Q-output terminals. As a result, 1-bit signals shown in FIGS. 16(W) and 16(X) are forwarded from the Q-output terminals of flip-flops 100c and 100d to the circuit (not shown) inside reception-side chip 90. Thereby, the signal sent by 4-phase transmission is restored into the upper two bits of the original digital signal. In this way, in combination with two bits based on a 4-phase transmission, the received data having four bits restored is output by 4-phase 4-line transmission, from flip-flops 100a to 100d.

According to the present exemplary embodiment, based on the 4-phase 4-line transmission mode, 4-bit data can be transmitted to reception-side chip 90 as a separate semiconductor chip by a signal charging/discharging of through-hole interconnections during one clock cycle. Accordingly, compared to the transmission circuit for transmitting 4-bit data using four chip-to-chip lines, it is possible to reduce the number of times of charging/discharging of the interconnections to half, hence it is possible to achieve chip-to-chip communication using through-hole interconnections of high capacitance and an ESD terminal, with low power consumption.

In the present exemplary embodiment, though the 4-phase 4-line transmission mode is used, in order to reduce the number of times of charging/discharging of the interconnection to be lower than that of the transmission circuit for transmitting 2-bit data through a single chip-to-chip interconnection, the number of phases or the number of lines may be greater than that in the 2-phase 2-line transmission mode. In the 2-phase 2-line transmission mode, one bit of data is transmitted by two phases and one bit of data is transmitted by two lines. Accordingly, in the 2-phase 2-line transmission mode, in total, two bits of data are transmitted under the operational condition in which a signal charging or discharging of the interconnection is performed in each clock cycle. This is the same for transmitting the same amount of data using the same number of charging discharging cycles as used for the transmission circuit for transmitting 2-bit data using a one chip to chip interconnection. Therefore, if 2-phase 4-line transmission mode is used, one bit by two phases and two bits by four lines, in total, three bits of data can be transmitted under the operational condition in which one charging or discharging cycle is performed in each clock cycle. Accordingly, the number of times that an interconnection is charged/discharged is reduced to two thirds of the number of times that that the transmission circuit, which transmits 2-bit data via one chip to chip interconnection, is charged. This means that it is possible to obtain the advantage of the power consumption-reduction effect of the same level as that obtained in 8-phase transmission mode using phase transmission only, by splitting the time axis of one clock cycle into halves. Further, in the case of 2-phase 8-line transmission mode, one bit by two phases and three bits by eight lines, in total, four bits of data can be transmitted under the operational condition in which one charging or discharging cycle is performed in each clock cycle. Accordingly, the number of times that an interconnection is charged/discharged is reduced to half of the number of times that that the transmission circuit, which transmits 2-bit data via one chip to chip interconnection, is charged.

Figure 17:
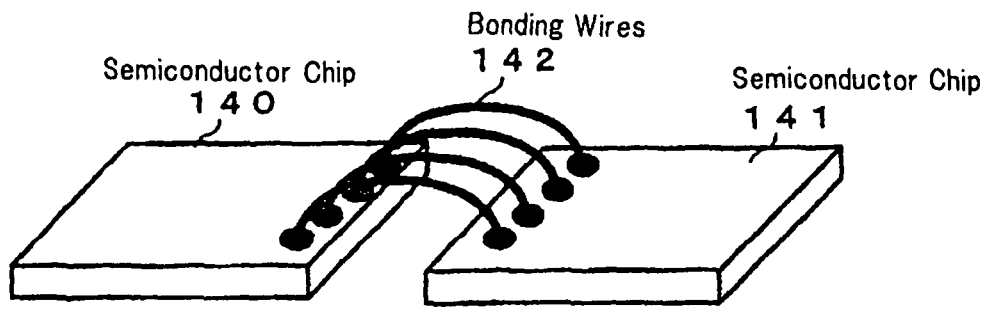
FIG. 17 is a perspective view showing a semiconductor device that performs data transmission between chips arranged side by side, using bonding wires.
Figure 18:
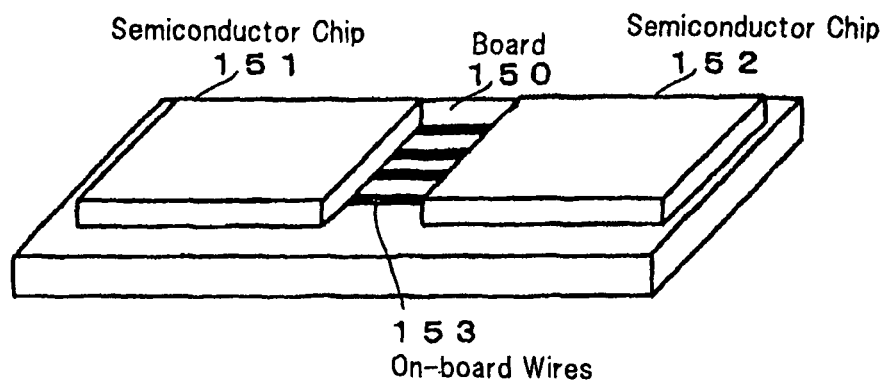
FIG. 18 is a perspective view showing a semiconductor device that performs data transmission between chips arranged side by side, using on-board wires; and, FIG. 19 is a perspective view showing a semiconductor device that performs data transmission between circuits using on-chip interconnections.

Here, although, in the exemplary embodiments heretofore, the through-hole interconnection that can be formed when semiconductor chips are stacked is used as the chip-to-chip interconnection, the method of inter-chip connection is not limited to this. That is, a chip-to-chip interconnection when semiconductor chips are arranged side by side instead of being stacked, may also be used. In this case, the inter-chip connection between semiconductor chips 140 and 141 arranged side by side may be implemented with bonding wires 142 as shown in FIG. 17. Alternatively, as shown in FIG. 18, the inter-chip connection between semiconductor chips 151 and 152 provided side by side on board 150 may be implemented with on-board wires 153. Since these bonding wires 142 and on-board wires 153 need a large electric current to drive the interconnection, they consume a large amount of power. Accordingly, in order to lower the power consumption by reducing the number of times of charging/discharging cycle, a multi-phase transmission mode as used in the above exemplary embodiments is effective.

Figure 19:
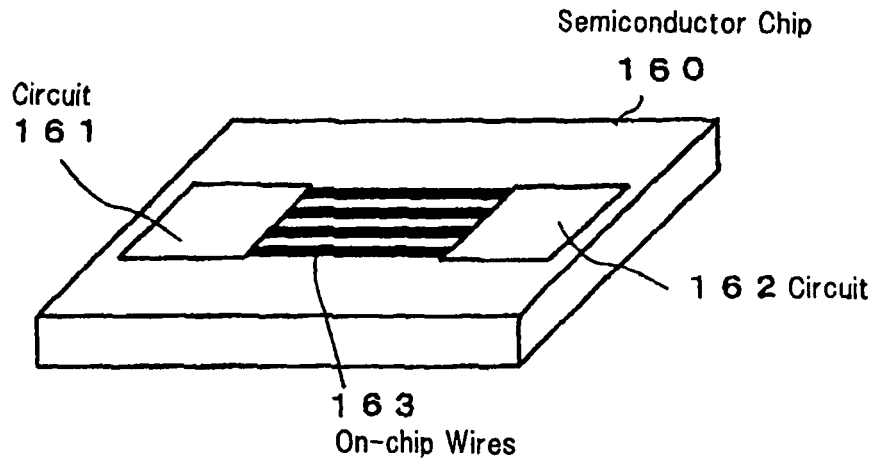

Further, though the above exemplary embodiments were described taking an example of communication between separate semiconductor chips, the present invention may be applied to a case where, as shown in FIG. 19, communication between two circuits 161 and 162 arranged apart from each other on single semiconductor chip 160 is achieved using on-chip wires 163, in order to reduce the power consumption for charging and discharging due to interconnection capacitance that is increased in long interconnection.

The effect of the present invention is, for example, to realize a reduction in the power consumption of a semiconductor device in which a plurality of semiconductor chips are stacked, or arranged on a plane, by reducing the number of times that the interconnection is charged/discharged in each clock cycle, using the phases of amplitude transition and/or line selection when two or more bits of data are transmitted between the semiconductor chips.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A transmission method for transmitting transmission data via a plurality of lines, comprising:
   transmitting, through each line, data that has one rising or falling transition of an amplitude of the data in each clock cycle of a clock and that carries a 1- or greater bit value, using a phase from an edge of said clock to said transition in amplitude of the data; and
   transmitting data by selecting one line for transmitting said data from said plurality of lines in accordance with a 1- or greater bit value of a second data to be transmitted for each of a same number of consecutive clock cycles of said clock as a number of said lines.

2. The transmission method according to claim 1, wherein said phases include two or more phases and said lines include three or more lines.

* * * * *